United States Patent [19]

Tsukada et al.

[11] Patent Number: 5,432,886
[45] Date of Patent: Jul. 11, 1995

[54] SPEECH RECOGNITION DEVICE FOR CALCULATING A CORRECTED SIMILARITY PARTIALLY DEPENDENT ON CIRCUMSTANCES OF PRODUCTION OF INPUT PATTERNS

[75] Inventors: Satoshi Tsukada; Takao Watanabe, both of Tokyo, Japan

[73] Assignee: NEC Corporation, Tokyo, Japan

[21] Appl. No.: 832,600

[22] Filed: Feb. 7, 1992

[30] Foreign Application Priority Data

Feb. 7, 1991 [JP] Japan .................................. 3-060786

[51] Int. Cl.$^6$ ................................................ G10L 9/00
[52] U.S. Cl. ...................................... 395/2.48; 395/2.6
[58] Field of Search .................................. 381/41–46; 395/2, 2.4, 2.45–2.49, 2.6

[56] References Cited

U.S. PATENT DOCUMENTS 4,059,725 11/1977 Sakoe ..................................... 381/43
4,286,115  8/1981 Sakoe ..................................... 381/43
4,624,010 11/1986 Takebayashi ......................... 381/41
4,723,290  2/1988 Watanabe et al. .................... 381/43
4,783,806 11/1988 Nakamura et al. ................... 381/43

Primary Examiner—Allen R. MacDonald
Assistant Examiner—Michelle Doerrler
Attorney, Agent, or Firm—Sughrue, Mion, Zinn, Macpeak & Seas

[57] ABSTRACT

In a speech recognition device including a similarity calculator for calculating a usual similarity as a provisional similarity between an input pattern and prepared reference patterns, a calculating arrangement calculates a reference similarity between the input pattern and produced reference patterns. A correcting unit corrects the provisional similarity by the reference similarity into a corrected similarity. As usual, the similarity may be a dissimilarity. The prepared reference patterns may be memorized in the calcultor or be given by concatenations of primary recognition units. Preferably, the produced reference patterns are concatenations of secondary recognition units memorized in a memory.

19 Claims, 4 Drawing Sheets

SPEECH RECOGNITION DEVICE FOR CALCULATING A CORRECTED SIMILARITY PARTIALLY DEPENDENT ON CIRCUMSTANCES OF PRODUCTION OF INPUT PATTERNS

BACKGROUND OF THE INVENTION

This invention relates to a speech recognition device for use in primarily recognizing an input speech signal and in additional for producing a reject signal indicative of a portion the input speech signal, which cannot be recognized.

The input speech signal represents typically a sequence of connected words as an input pattern. It is known in the art that the speech recognition device comprises a similarity measure calculating unit for calculating similarity measures between the input pattern and a plurality of prepared reference patterns and for selecting a maximum value of the similarity measures as a sole similarity measure which is herein called a provisional similarity measure. The prepared reference patterns may be either preliminarily stored in the similarity measure calculating unit or given by concatenations of selected units of recognition units which are, for example, phonemes, syllables, and/or isolated words, which are memorized in a recognition unit memory, and are concatenated into the concatenations by the similarity measure calculating unit. The above-mentioned part of the input speech signal may therefore be a part of the recognition units.

When produced by a conventional speech recognition device, the provisional similarity measure is strongly dependent on circumstances under which the input pattern is produced. The circumstances may be a difference between speakers of, for example, the connected words. On recognizing the input pattern as a whole, the provisional similarity measure should be greater than a predetermined threshold value. Otherwise, at least a part of the input pattern represents a recognition unit which is unknown to the speech recognition device, such as an unknown word. In this instance, the speech recognition device should produce the reject signal.

As usual, the similarity measure may represent a dissimilarity, such as a distance, between the input pattern and each of the prepared reference patterns. In this event, a minimum value must be used instead of the maximum value. At any rate, it has been mandatory to select the threshold value in consideration of the circumstances. Otherwise, the speech recognition device has an objectionable reliability.

SUMMARY OF THE INVENTION

It is consequently an object of the present invention to provide a speech recognition device capable of calculating a similarity measure which partially depends on circumstances under which an input pattern is produced.

It is another object of this invention to provide a speech recognition device which is of the type described and has a high reliability.

Other objects of this invention will become clear as the description proceeds.

According to the invention, it is possible to understand that a speech recognition device includes a similarity measure calculating unit for calculating primary similarity measures between an input pattern and a first plurality of prepared reference patterns and for selecting a maximum value of the primary similarity measures as a provisional similarity measure.

According to this invention, the above-understood speech recognition device comprises: (A) similarity measure calculating means for calculating secondary similarity measures between the input pattern and a second plurality of produced reference patterns produced in compliance with the prepared reference patterns and for selecting a maximum value of the secondary similarity measures as a reference similarity measure; and (B) a similarity measure correcting unit connected to the similarity measure calculating unit and the similarity measure calculating means for correcting the provisional similarity measure by the reference similarity measure into a corrected similarity measure.

On setting forth an aspect of this invention, the similarity measure calculating unit will be called a first calculating unit. The above-described prepared reference patterns are memorized reference patterns memorized in the first calculating unit.

According to the aspect being described, the similarity measure calculating means comprises: (A) a recognition unit memory for memorizing recognition units of the memorized reference patterns: and (B) a second calculating unit connected to the recognition unit memory and supplied with the input pattern for calculating the secondary similarity measures between the input pattern and concatenated reference patterns of the second plurality in number and for selecting a maximum value of the secondary similarity measures as the reference similarity measure, where the concatenated reference patterns serve as the produced reference patterns and are concatenations of selected units which are selected from the recognition units in compliance with the memorized reference patterns.

On setting forth a different aspect of this invention, it should be noted that the input pattern is represented by a time sequence which is divisible into time sequence frames and consists of input feature vectors and that the prepared reference patterns are memorized reference patterns memorized in the similarity measure calculating unit with each of the memorized reference patterns represented by a time sequence of memorized feature vectors.

According to the different aspect of this invention, the similarity measure calculating means comprises: (A) an inter-vector similarity calculating unit connected to the similarity measure calculating unit and supplied with the input pattern for calculating inter-vector similarity measures between the input feature vectors of the time sequence frames and the memorized feature vectors of the memorized reference patterns with the inter-vector similarity measures of the first plurality in number calculated relative to each of the time sequence frames and for selecting maximum values of the inter-vector similarity measures calculated relative to the time sequence frames, respectively; and (B) an accumulating unit connected to the inter-vector similarity calculating unit for accumulating the maximum values into an accumulation for use as the reference similarity measure.

On setting forth a further aspect of this invention, in connection with the afore-understood above-described speech recognition device that the similarity measure calculating unit comprises (a) a first recognition unit memory for memorizing primary recognition units of the prepared reference patterns and (b) a first calculating unit connected to the first recognition unit memory and supplied with the input pattern for calculating the primary similarity measures between the input pattern and primary concatenated reference patterns of the first plurality in number and for selecting a maximum value of the primary similarity measures as the provisional similarity measure, where the primary concatenated reference patterns serve as the prepared reference patterns and are concatenations of primary selected units which are selected from the primary recognition units in compliance with the prepared reference patterns.

According to the further different aspect of this invention, the similarity measure calculating means comprises: (A) a second recognition unit memory for memorizing secondary recognition units selected in compliance with the prepared reference patterns: and (B) a second calculating unit connected to the second recognition unit memory and supplied with the input pattern for calculating the secondary similarity measures between the input pattern and secondary concatenated reference patterns of the second plurality in number and for selecting a maximum value of the secondary similarity measures as the reference similarity measure, where the secondary concatenated reference patterns serve as the produced reference patterns and are concatenations of secondary selected units which are selected from the secondary recognition units in compliance with the prepared reference patterns. It should be noted in connection with the first calculating unit used according to the further different aspect of this invention that the input pattern becomes a succession of segment patterns corresponding to particular units concatenated among the primary selected units into one of the primary concatenated reference patterns that gives the provisional similarity measure. In this connection, the similarity measure correcting unit comprises: (1) a unit similarity calculating unit connected to the first calculating unit for calculating unit similarity measures between the segment patterns and the particular units; and (2) a unit similarity correcting unit connected to the unit similarity calculating unit and the second calculating unit for dividing the reference similarity measure into interval similarity measures in correspondence to the particular units and for correcting each of the unit similarity measures into the corrected similarity measure by one of the interval similarity measures that corresponds to one of the particular units, where the last-mentioned one of the particular units is what is used in calculating the above-mentioned each of the unit similarity measures.

On setting forth even a aspect of this invention, it should be understood that the input pattern is represented by a time sequence of input feature vectors and that the similarity measure calculating unit comprises (a) a recognition unit memory for memorizing recognition units of the prepared reference patterns with each of the recognition units represented by a time sequence of memorized feature vectors and (b) an elementary calculating unit connected to the recognition unit memory and supplied with the input pattern for calulating, in connection with the input feature vectors and the memorized feature vectors of the recognition units, the primary similarity measures between the input pattern and concatenated reference patterns of the first plurality in number and for selecting a maximum value of the primary similarity measures as the provisional similarity measure, where the concatenated reference patterns serve as the prepared reference patterns and are concatenations of selected units which are selected from the recognition units in compliance with the prepared reference patterns. It should furthermore be understood that the time sequence is divisible into time sequence frames.

According to the still further different aspect of this invention, the similarity measure calculating means comprises: (A) an inter-vector similarity calculating unit connected to the recognition unit memory and supplied with the input pattern for calculating inter-vector similarity measures between the input feature vectors of the time sequence frames and the memorized feature vectors of the recognition units with the inter-vector similarity measures of the first plurality in number calculated relative to each of the time sequence frames and for selecting maximum values of the inter-vector similarity measures calculated relative to the time sequence frames, respectively; and (B) an accumulating unit connected to the inter-vector similarity calculating unit for accumulating the maximum values into an accumulation for use as the reference similarity measure. It should be noted in connection with the elementary calculating unit that the input pattern becomes a succession of segment patterns corresponding to particular units concatenated among the selected units into one of the concatenated reference patterns that gives the provisional similarity measure. In this connection, the similarity measure correcting unit comprises: (1) a unit similarity calculating unit connected to the elementary calculating unit for calculating unit similarity measures between the segment patterns and the particular units; and (2) a unit similarity correcting unit connected to the unit similarity calculating unit and the accumulating unit for dividing the reference similarity measure into interval similarity measures in correspondence to the particular units and for correcting each of the unit similarity measures into the corrected similarity measure by one of the interval similarity measures that corresponds to one of the particular patterns, where the last-mentioned one of the particular units is what is used in calculating the above-mentioned each of the unit similarity measures.

DESCRIPTION OF THE PREFERRED EMBODIMENTS

Figure 1:
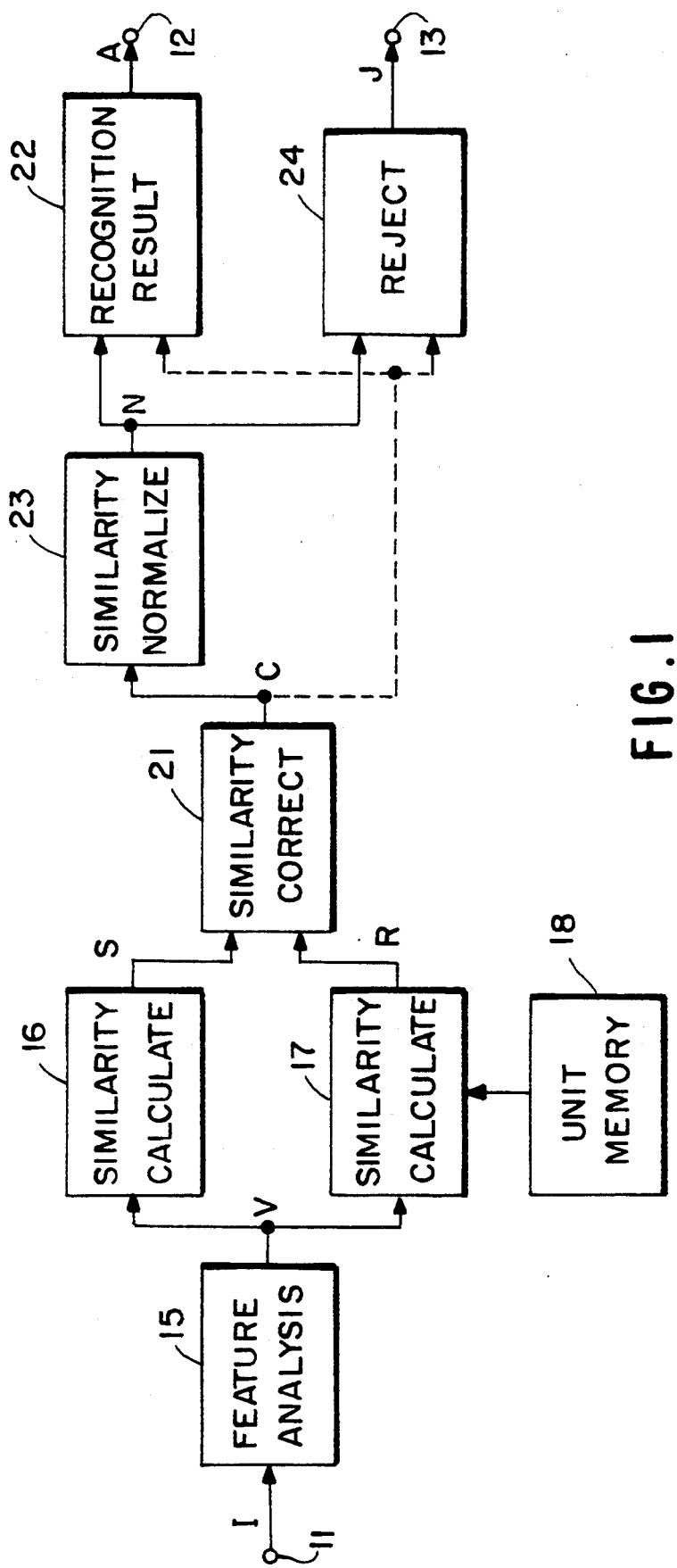
FIG. 1 is a block diagram of a speech recognition device according to a first embodiment of the instant invention.

Referring to FIG. 1, the description will begin with a speech recognition device according to a first embodiment of the present invention. The speech recognition device has a device input terminal 11, a recognition result signal output terminal 12, and a reject signal output terminal 13. The device input terminal 11 is supplied with an input speech signal I. The speech recognition device is for delivering a recognition result signal A to the recognition result signal output terminal 12 and a reject signal J to the reject signal output terminal 13.

The recognition result signal and the reject signal will become clear as the description proceeds.

The input speech signal I typically represents a sequence of connected words. Alternatively, the input speech signal may represent one or a plurality of isolated or discrete words. In general, the input speech signal represents an input pattern. As an input pattern length, the input pattern has a duration of time that depends primarily on the number of the connected words of a sequence or on the number of the isolated words included in the input pattern and that is represented by a start and an end pulse or signal of the input speech signal. It is possible to understand that the device input terminal 11 is supplied with the input pattern continuously during the duration of time.

From the device input terminal 11, the input pattern is supplied to a feature calculating unit 15 for subjecting the input pattern to feature analysis to convert the input pattern to a time sequence of input feature vectors V. The input time sequence is divisible into time sequence frames. Each time sequence frame is typically 10 milliseconds long.

Various methods are practical for carrying out the feature analysis. For example, a plurality of methods, including one according to mel-cepstrum and another according to linear predictive coding (LPC) analysis, are described in a book which is written by Sadaoki Furui and published by the Marcel Dekker, Incorporated, under the title of "Digital Speech Proccessing, Synthesis, and Recognition", pages 45 to 137.

From the feature calculating unit 15, the time sequence of input feature vectors V is delivered to first or elementary and second calculating units 16 and 17. The first calculating unit 16 is alternatively referred to herein as a similarity measure calculating unit.

In the manner known in the art and described above, the time sequence of input feature vectors V represents the input pattern. It is therefore possible depending on the circumstances to understand that the first and the second calculating units 16 and 17 are supplied with the input pattern in common from the device input terminal 11 through the feature calculating unit 15.

A first plurality of reference patterns are preliminarily stored in the first calculating unit 16 as prepared or memorized reference patterns. The first plurality is either equal to or a little greater in number than different input patterns which should be recognized by the speech recognition device. When the speech recognition device is used to recognize a sequence of decimal numbers which are discretely spoken digit by digit, the first plurality may be equal to ten. Alternatively, the first plurality may be two or three greater than ten in order to deal with a case where, for example, "zero" is alternatively spoken as "oh" and "null". Ordinarily, the first plurality is equal to several hundreds. Each of the prepared or the memorized reference patterns is represented by a time sequence of memorized feature vectors.

The first calculating unit 16 is for carrying out comparison collation between the input pattern and the prepared reference patterns to calculate similarity measures between the input pattern and the prepared reference patterns and to select a maximum value of the similarity measures as a sole similarity measure between the input pattern and a particular pattern of the prepared reference patterns. For convenience of the description which follows, the similarity measures are herein called primary similarity measures. The sole similarity measure is referred to herein as a provisional similarity measure S.

More particularly, the time sequence of input feature vectors V is compared with each time sequence of memorized feature vectors to calculate one of the primary similarity measures. For the comparison collation and selection of the maximum value, it is possible to resort to any one of various known methods which are used in practice.

For example, a plurality of methods are described in Furui, pages 230 to 249, including a dynamic programming (DP) algorithm. Another method is described in an article contributed by S. E. Levinson, L. R. Rabiner, and M. M. Sondhi to the Bell System Technical Journal, Volume 62, No. 4 (April 1983), pages 1035 to 1074, under the title of "An Introduction to the Application of the Theory of Probabilistic Functions of a Markov Process to Automatic Speech Recognition", which method is known in general as a method according to HMM (hidden Markov models).

It is possible to preliminarily store recognition units of the prepared reference patterns in the first calculating unit 16. The recognition units may be phonemes, syllables, and/or isolated or discrete words in the manner exemplified in Furui, page 6. Under the circumstances, the first calculating unit 16 should select selected units from the recognition units in consideration of the prepared reference patterns and concatenate the selected units into concatenations which are for use as the prepared reference patterns and are called concatenated reference patterns and in which the selected units are concatenated in predetermined orders so as to give significance to the concatenated reference patterns.

The memorized reference patterns may be such concatenated reference patterns. Like the primary similarity measures, the recognition units are called primary recognition units. The concatenated reference patterns are called primary concatenated reference patterns. The selected units are referred to as primary selected units. When attention is directed to one of the primary concatenated reference patterns that gives the provisional similarity measure S, the primary selected units are called particular units.

It is already known to carry out comparison collation while concatenating the primary selected units into the primary concatenated reference patterns. For example, a method is described in Furui, page 264. Another method is described in an article contributed by S. E. Levinson to the Proceedings of the IEEE, Volume 73, No. 11 (November 1985), pages 1625 to 1650, under the title of "Structural Methods in Automatic Speech Recognition". It is convenient to use the so-called T table disclosed in U.S. Pat. Nos. 4,049,913 or 4,059,725 issued to Hiroaki Sakoe and assigned to the present assignee.

The second calculating unit 17 is accompanied by a recognition unit memory 18 for memorizing a plurality of secondary recognition units which are the recognition units of the prepared reference patterns memorized in the first calculating unit 16. Like the first calculating unit 16, the second calculating unit 17 selects secondary selected units from the secondary recognition units in compliance with the prepared reference patterns, concatenates the secondary selected units into secondary cancatenated reference patterns for use as produced reference patterns of a second plurality in number, calculates secondary similarity measures between the input pattern and the produced reference patterns, and selects a maximum value of the secondary similarity measures.

This maximum value is herein called a reference similarity measure R and is a similarity measure between the input pattern and a specific pattern of the produced reference patterns. The second plurality may be substantially equal to the first plurality.

It is now understood that a combination of the second calculating unit 17 and the recognition unit memory 18 serves as a similarity measure calculating arrangement. Supplied with the input pattern and producing the produced reference patterns, the similarity measure calculating arrangement (17, 18) calculates the secondary similarity measures between the input pattern and the produced reference patterns and selects the reference similarity measure R.

Connected to the first and the second calculating units 16 and 17, a similarity measure correcting unit 21 corrects the provosional similarity measure S by the reference similarity measure R into a corrected similarity measure C. As the corrected similarity measure, the similarity measure correcting unit 21 may calculate either a difference or a ratio between the provisional and the reference similarity measures.

In a conventional speech recognition device, the particular pattern of the prepared reference patterns is used as a recognition result of the input pattern. It should be noted in this connection that the provisional similarity measure S, as herein called, is strongly dependent on circumstances under which the input pattern is produced for supply to the speech recognition device. This strong dependency results in an objectionable error on producing a reject signal.

In marked contrast, the corrected similarity measure C is scarcely dependent on the circumstances. This is because the provisional and the reference similarity measures S and R are substantially equally influenced by the circumstances. It should, however, be clearly noted that the corrected similarity measure represents a sort of difference between the provisional and the reference similarity measures and is what is like a dissimilarity between the input pattern and specific pattern.

From the similarity measure correcting unit 21, the corrected similarity measure C is delivered to a recognition result determining unit 22 for judging whether or not the corrected similarity measure is greater than a first predetermined threshold value. When the corrected similarity measure is not greater than the threshold value, it is understood that the provisional and the reference similarity measures S and R are widely different and that the particular pattern of the prepared reference patterns is not a correct recognition result of the input pattern and should be rejected. The determining unit 22 therefore produces the specific pattern of the produced reference patterns as the recognition result. From the determining unit 22, the result signal A is delivered to the recognition result signal output terminal 12 to represent the recognition result.

It should be noted in connection with the foregoing that the corrected similarity measure C is still dependent on the duration of time of the input pattern. In other words, the corrected similarity measure is given different values when one and the same input pattern is long and short. This dependency remains even when the input pattern and each of the prepared and the produced reference patterns are warped to each other on calculating a pertinent one of the primary and the secondary similarity measures.

As a consequence, a normalizing unit 23 is preferably connected to the similarity measure correcting unit 21 to normalize the corrected similarity measure C by the duration of time of the input pattern into a normalized similarity measure N. The duration of time is indicated by the start and the end pulses described before. It is now possible to obtain a similarity measure which is dependent neither on the circumstances nor on the duration of time of the input pattern.

As a further consequence, it is preferred that the recognition result determining unit 22 should be supplied with the normalized similarity measure N from the norsalizing unit 23 rather than with the corrected similarity measure C directly from the similarity measure correcting unit 21 through a connection which is depicted in FIG. 1 by a dashed line. Inasmuch as the normalized similarity measure is not equal to the corrected similarity measure, the determining unit 22 should judge, on determining the recognition result, whether or not the normalized similarity measure is greater than a second predetermined threshold value.

In any event, the normalized similarity measure N gives an astonishingly excellent precision to the speech recognition device being illustrated. In other words, the illustrated speech recognition device is unexpectedly reliable. When the normalized similarity measure is used as above, the second predetermined threshold value will be referred to merely as a predetermined threshold value.

When the normalized similarity measure N is not greater than the predetermined threshold value, none of the prepared reference patterns is identified as the recognition result. It is preferable in such an event to indicate the fact. A rejection unit 24 is therefore connected to the normalizing unit 23 to judge whether or not the normalized similarity measure is greater than the predetermined threshold value. When the normalized similarity measure is not greater than the threshold value, the rejection unit 24 delivers an overall reject signal to the reject signal output terminal 13 as the reject signal J.

More specifically, it will be surmised that the normalized similarity measure N is not greater than the predetermined threshold value. The particular pattern of the prepared reference patterns includes in this event an objectionable part which does not represent one of the primary recognition units but represents an unknown recognition unit other than the those used in the prepared reference patterns. Such an unknown recognition unit may briefly be called an unknown word. It is desirable under the circumstances that the speech recognition device should indicate presence of the objectional part by a local reject signal, which will later be described.

Reviewing FIG. 1, it is possible to put the rejection unit 24 in operation by the corrected similarity measure C in the manner depicted by another dashed line. When the normalized similarity measure N is greater than the predetermined threshold value, it is possible to make the recognition result determining unit 22 produce the particular pattern which is selected by the first calculating unit 16 from the prepared reference patterns on selecting the provisional similarity measure S. In this connection, it should be understood that the recognition result signal output terminal 12 is connected to the first calculating unit 16 through the determining unit 22, the normalizing unit 23, and the correcting unit 21. It should furthermore be understood that the speech recognition device is operable in this event like a conventional speech recognition device.

Figure 2:
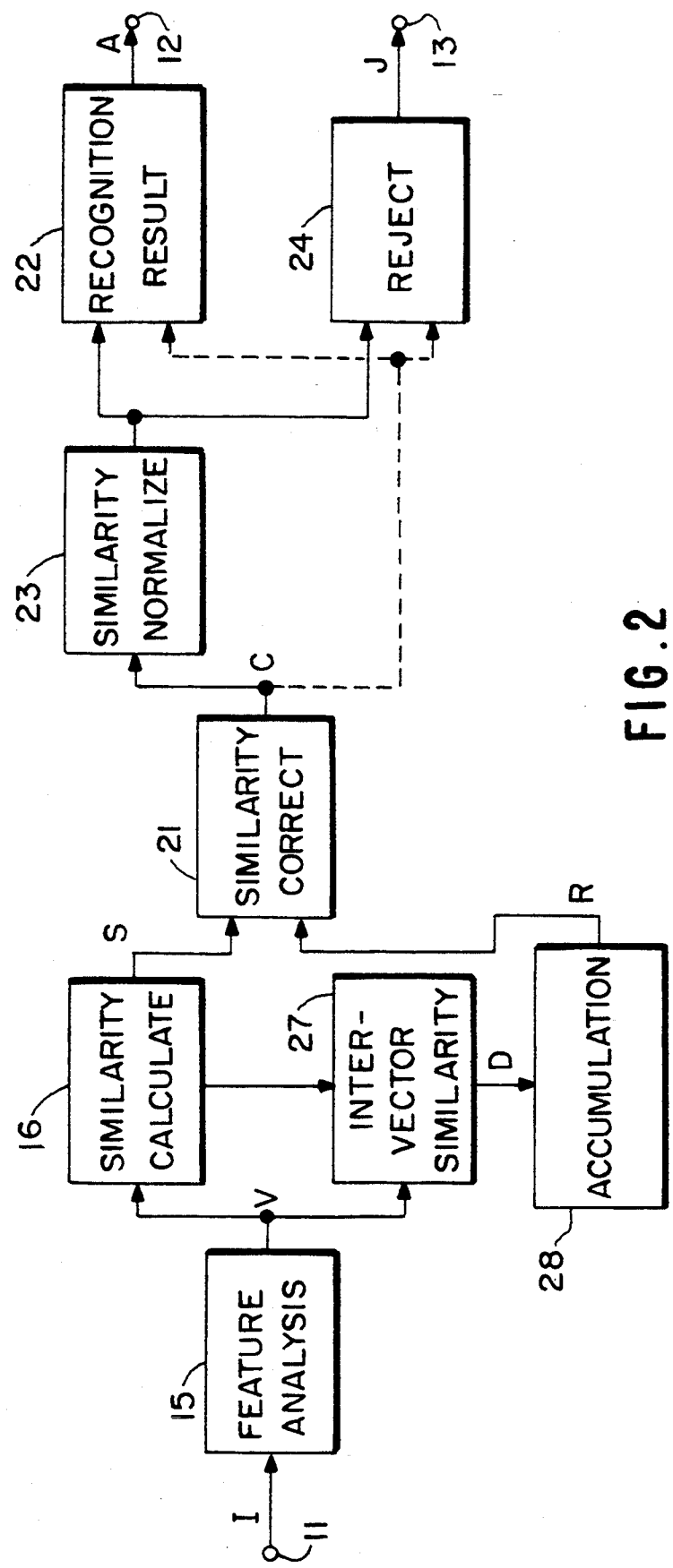
FIG. 2 is a block diagram of a speech recognition device according to a second embodiment of this invention.

Referring now to FIG. 2, the description will be directed to a speech recognition device according to a second embodiment of this invention. The speech recognition device comprises similar parts which are designated by like reference numerals and are similarly operable with likewise named signals.

In FIG. 2, the simirality measure calculating arrangement is a combination of an inter-vector similarity calculating unit 27 and an accumulating unit 28 rather than the combination of the second calculating unit 17 and the recognition unit memory 18 which are described in conjunction with FIG. 1. In other respects, the illustrated speech recognition device is not different from that illustrated with reference to FIG. 1.

The inter-vector similarity calculating unit 27 is supplied from the feature calculating unit 15 with the input feature vectors of the time sequence frames as the input pattern and from the first calculating unit 16 with the memorized feature vectors of time sequences which are representative of the memorized reference patterns, respectively. In the manner described in connection with the first calculating unit 16, the inter-vector similarity calculating unit 27 calculates a plurality of inter-vector similarity measures D between the input feature vectors of the time sequence frames and the memorized feature vectors representative of the memorized reference patterns.

It should be noted in this regard that the inter-vector similarity measures D of the first plurality in number should be calculated relative to each of the time sequence frames, namely, between the input feature vectors of each time sequence frame and the memorized feature vectors of the time sequences. The inter-vector similarity calculating unit 27 is additionally for selecting maximum values of the inter-vector similarity measures which are calculated relative to the time sequence frames, respectively, namely, in connection with the input and the memorized feature vectors as regards the time sequence frames, respectively.

Connected to the inter-vector similarity calculating unit 27, the accumulating unit 28 accumulates the maximum values into an accumulation. In the manner which will be described in the following and will later be described more in detail, it will be appreciated that the accumulation gives the reference similarity measure R.

In connection with the speech recognition device being illustrated, it will be noticed that nothing is positively mentioned as regards the produced reference patterns and the secondary similarity measures between the input pattern and the produced reference patterns. It should, however, be understood that the memorized feature vectors are representative of the memorized reference patterns and are used in the inter-vector similarity calculating unit 27 separately from the first calculating unit 16. This makes it possible to understand that "produced reference patterns" are equivalently used in the inter-vector similarity calculating unit 27. The inter-vector similarity measures D are therefore equivalent to the secondary similarity measures. In this manner, the accumulation gives the reference similarity measure R.

Figure 3:
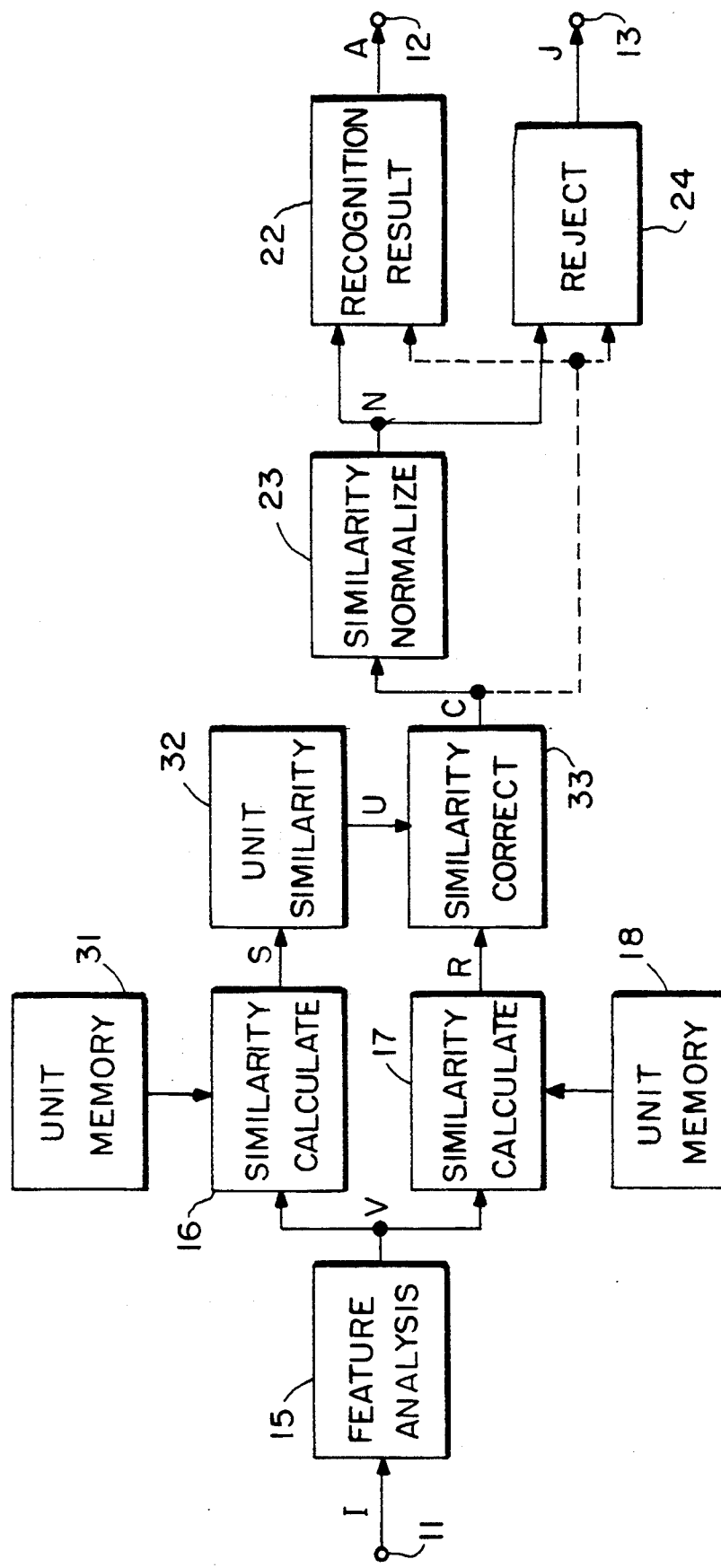
FIG. 3 is a block diagram of a speech recognition device according to a third embodiment of this invention.

Referring to FIG. 3, attention will now be directed to a speech recognition device according to a third embodiment of this invention. Similar parts are designated again by like reference numerals and are similarly operable with likewise named signals.

In FIG. 3, the first calculating unit 16 is accompanied by a first recognition unit memory 31 for memorizing a plurality of primary recognition units which are of the type described above and can be concatenated into primary concatenated reference patterns of the first plurality in number. The primary concatenated reference patterns are for use as the prepared reference patterns when primary selected units are selected from the primary recognition units in consideration of the prepared reference patterns and are concatenated in predetermined orders of the type described before.

The first calculating unit 16 is connected to the first recognition unit memory 31 to select the primary selected units from the primary recognition units and to concatenate the primary selected units into the primary concataneted reference patterns in the manner which is described with reference to FIG. 1 in connection with the second calculating unit 17. Supplied with the input pattern through the feature calculating unit 15, the first calculating unit 16 calculates the primary similarity measures as before between the input pattern and the primary concatenated reference patterns. The first calculating unit 16 is furthermore for selecting the maximum value of the primary similarity measures as the provisional similarity measure S. The similarity measure calculasing unit is different in this manner from that described in conjunction with FIG. 1 and comprises the first calculating unit 16 and the first recognition unit memory 31.

The recognition unit memory 18 is now called a second recognition unit memory. Connected to the second recognition unit memory 18 and in the manner described before, the second calculating unit 17 selects secondary selected units from the secondary recognition units in consideration of the prepared reference patterns and concatenates the secondary selected units in predetermined orders into secondary concatenated reference patterns which are for use as the produced reference patterns and are the second plurality in number. Supplied with the input pattern through the feature calculating unit 15, the second calculating unit 17 calculates the secondary similarity measures between the input pattern and the secondary concatenated reference patterns and selects the maximum value of the secondary similarity measures as the reference similarity measure R.

The similarity measure correcting unit 21 (FIG. 1) now comprises a unit similarity calculating unit 32. It should be understood in connection with the first calculating unit 16 accompanied by the first recognition unit memory 31 that the first calculating unit 16 determines the particular units described before when the provisional similarity measure S is calculated. The input pattern therefore becomes a succession of segment patterns corresponding to the particular patterns, respectively. Connected to the first calculating unit 16 to use the particular units, the unit similarity calculating unit 32 calculates unit similarity measures U between the segment patterns and the particular units corresponding to the segment patterns, respectively. That is, each unit similarity measure is calculated between one of the segment patterns and one of the particular units that corresponds to the segment pattern under consideration.

The similarity measure correcting unit 21 furthermore comprises a unit similarity correcting unit 33. Connected to the unit similarity calculating unit 32 to use the particular units and to the second calculating unit 17, the unit similarity correcting unit 33 divides the reference similarity measure R into interval similarity measures in correspondence to the particular units, respectively. In other words, pattern intervals are determined in the particular pattern of the prepared reference patterns in correspondence to the particular units, respectively. Furthermore, the unit similarity correcting unit 33 corrects each of the unit similarity measures U into the corrected similarity measure C by one of the interval similarity measures that corresponds to one of the particular units, where the last-mentioned one off the particular units is what is used in calculating the above-mentioned each of the unit similarity measures.

It is now appreciated that the similarity measure correcting unit (32, 33) produces first the unit similarity measures U which may alternatively be called provisional unit similarity measures and are collectively used as the provisional similarity measure S. Subsequently, the similarity measure correcting unit corrects the provisional unit similarity measures into corrected unit similarity measures which are collectively used as the corrected similarity measure C.

Although designated by the reference numeral 23 as before, the normalizing unit may be called a unit similarity normalizing unit. Connected to the unit similarity correcting unit 33 to use the pattern intervals, the normalizing unit 23 normalizes the corrected unit similarity measures into normalized unit similarity measures for use collectively as the normalized similarity measure N. Normalization of the corrected unit similarity measure is done by durations of time of the pattern intervals corresponding to the particular units used in producing the provisional unit similarity measures and subsequently the normalized unit similarity measures. In other words, the normalizing unit 23 normalizes the corrected similarity measure C into the normalized similarity measure N by a duration of time of one of the interval similarity measures that is used in calculating the above-mentioned each of the unit similarity measures U.

The recognition result determining unit 22 can now judge whether or not each of the normalized unit similarity measures is greater than the predetermined threshold value. When all the normalised unit similarity measures are not greater than the threshold value, the determining unit 22 determines, as the recognition result of the input pattern, the specific pattern which gives the reference similarity measure R among the produced reference patterns.

Likewise, the rejection unit 24 can judge whether or not each of the normalized unit similarity measures is greater than the predetermined threshold value. When all the normalized unit similarity measures are not greater than the threshold value, the rejection unit 24 produces the overall reject signal as the reject signal J.

If one of the normalized unit similarity measures alone is not greater than the predetermined threshold value, it is understood that an unknown word is represented by one of the segment patterns that has the normalized unit similarity measure equal to or less than the threshold value relative to the particular unit corresponding to the segment pattern under consideration. The rejection unit 24 produces in this event the local reject signal as the reject signal J.

Figure 4:
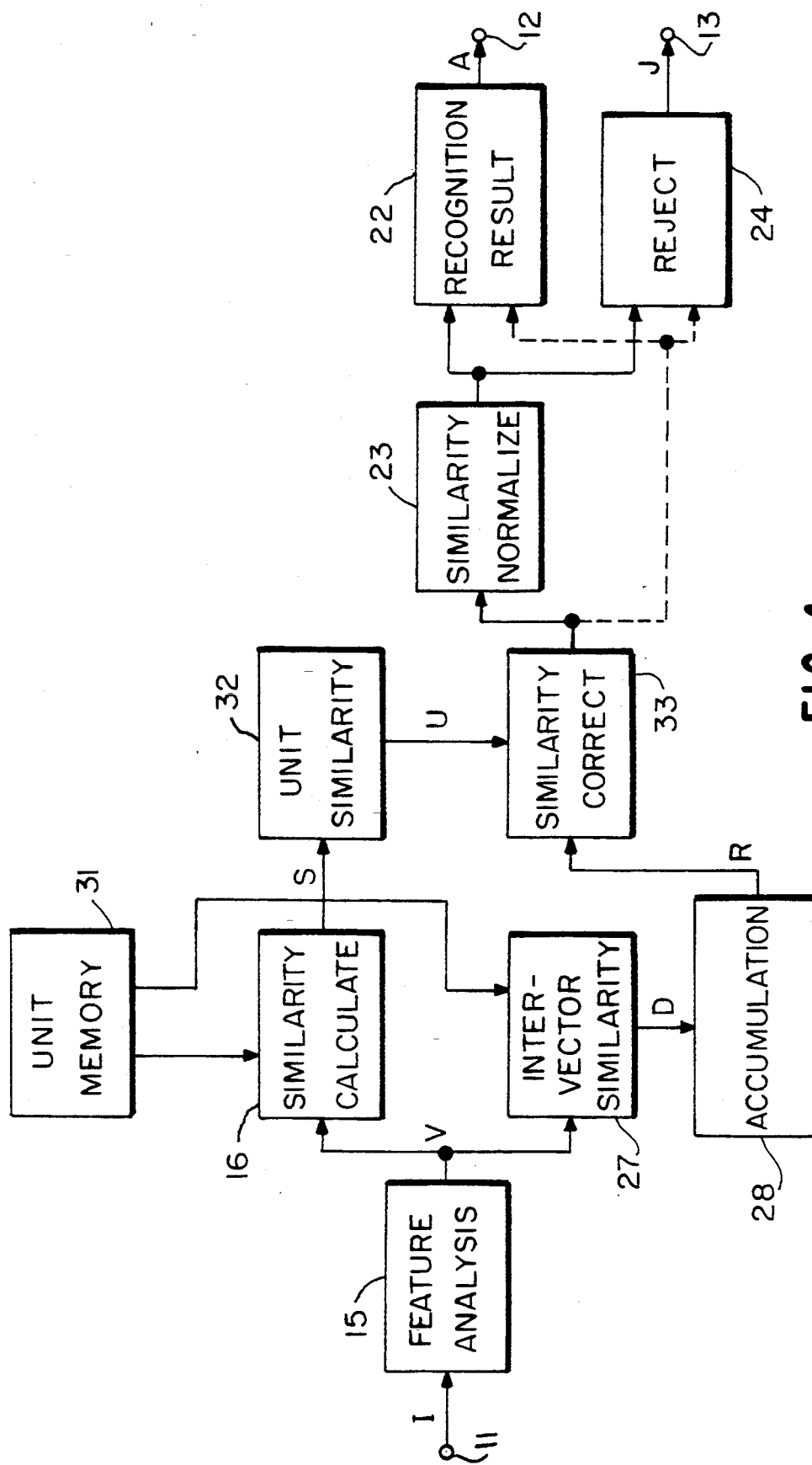
FIG. 4 is a block diagram of a speech recognition device according to a fourth embodiment of this invention.

Referring now to FIG. 4, the description will proceed to a speech recognition device according to a fourth embodiment of this invention. Similar parts are designated once again by like reference numerals and are similarly operable with likewise named signals.

In FIG. 4, the similarity measure calculating arrangement comprises the combination of the inter-vector similarity calculating unit 27 and the accumulating unit 28 in the manner described in conjuction with FIG. 2. In other respects, the illustrated speech recognition device is not different from that illustrated with reference to FIG. 3.

It should be noted in connection with FIG. 4 that the first recognition unit memory 31 is used in contrast to the speech recognition device illustrated with reference to FIG. 2. The inter-vector similarity calculating unit 27 is consequently connected to the first recognition unit memory 31 rather than to the first or the elementary calculating unit 16. The inter-vector similarity calculating unit 27 can therefore calculate the inter-vector similarity measures D between the input feature vectors of the time sequence frames and the memorized feature vectors of the time sequences which are representative of the recognition units memorized in the recognition unit memory 31, respectively.

Inasmuch as the memorized feature vectors of each time sequence are not representative of one of the memorized or the prepared reference patterns but one of the recognition units, the inter-vector similarity calculating unit 27 can now calculate the inter-vector similarity measures D of the second plurality in number relative to each of the time sequence frames, namely, between the input feature vectors of each time sequence frame and the memorized feature vectors representative of the recognition units. The maximum values are selected from the inter-vector similarity measures which are calculated relitive to the time sequence frames, respectively, namely, in connection with the input and the memorized feature vectors with respect to the time sequence frames, respectively.

As a consequence, it is clearer when compared with the inter-vector similarity calculating unit 27 described in conjunction with FIG. 2 that the illustrated inter-vector similarity calculating unit 27 calculates the inter-vector similirity measures as the secondary similarity measures between the input pattern and the produced reference patterns. The accumulating unit 28 clearly accumulates the maximum values into the reference similarity measure R. That is to say, the accumulation clearly represents the reference similarity measure.

While this invention has thus far been described in specific conjunction with several preferred embodiments thereof, it will now be readily possible for one skilled in the art to carry this invention into effect in various other manners. For instance, it is possible to use, instead of the segment patterns, frame patterns into which the input pattern is divided by the time sequence frames described before. Above all, it should be known in the manner described heretobefore that a minimum value should be used in place of the maximum value on selecting each of the provisional and the reference similarity measures S and R if each similarity measure represents a dissimilarity, such as a distance. Furthermose, the recognition result determining unit 22 should determine, as the reognition result of the input speech signal I, the specific pattern of the produced reference patterns when the normalized similarity measure N is not smaller than a predetermined threshold value. This applies to the rejection unit 24. It should be clearly known that such a speech recognition device is an equivalent of the speech recognition device illustrated with reference to each of the drawing figures.

What is claimed is:

1. A speech recognition device comprising:
   means for supplying an input speech signal;

means for converting said input speech signal into an input pattern indicative of features of said input speech signal;

a similarity measure calculating unit for calculating primary similarity measures between said input pattern and a first plurality of prepared reference patterns and for selecting a maximum value of said primary similarity measures as a provisional similarity measure;

similarity measure calculating means for calculating secondary similarity measures between said input pattern and a second plurality of produced reference patterns produced in compliance with said prepared reference patterns and for selecting a maximum value of said secondary similarity measures as a reference similarity measure;

a similarity measure correcting unit connected to said similarity measure calculating unit and said similarity measure calculating means for correcting said provisional similarity measure by modifying said provisional similarity measure by either a difference between said provisional similarity measure and said reference similarity measure or a ratio of said provisional similarity measure and said reference similarity measure and for outputting said corrected provisional similarity measure as a corrected similarity measure; and a normalizing unit connected to said similarity measure correcting unit for normalizing said corrected similarity measure into a normalized similarity measure by a duration of time of said input pattern.

2. A speech recognition device as claimed in claim 1, further comprising a determining unit, connected to said normalizing unit, for outputting as a recognition result when said normalized similarity measure is greater than a predetermined threshold, a signal indicative of a specific one of said prepared reference patterns that gives said provisional similarity measure.

3. A speech recognition device as claimed in claim 2, further comprising a rejection unit, connected to said normalizing unit, for outputting a reject signal indicating that said input speech signal cannot be recognized when said normalized similarity measure is not greater than said predetermined threshold value.

4. A speech recognition device comprising:

means for supplying an input speech signal;

means for converting said input speech signal into an input pattern indicative of features of said input speech signal;

a similarity measure calculating unit for calculating primary similarity measures between said input pattern and a first plurality of prepared reference patterns and for selecting a maximum value of said primary similarity measures as a provisional similarity measure;

similarity measure calculating means for calculating secondary similarity measures between said input pattern and a second plurality of produced reference patterns produced in compliance with said prepared reference patterns and for selecting a maximum value of said secondary similarity measures as a reference similarity measure; and a similarity measure correcting unit connected to said similarity measure calculating unit and said similarity measure calculating means for correcting said provisional similarity measure by modifying said provisional similarity measure by either a difference between said provisional similarity measure and said reference similarity measure or a ratio of said provisional similarity measure and said reference similarity measure and for outputting said corrected provisional similarity measure as a corrected similarity measure, said similarity measure calculating unit being a first calculating unit, said prepared reference patterns being stored reference patterns stored in said first calculating unit, wherein said similarity measure calculating means comprises:

a recognition unit memory for storing recognition units of said stored reference patterns; and a second calculating unit connected to said recognition unit memory and supplied with said input pattern for calculating said secondary similarity measures between said input pattern and concatenated reference patterns of a second plurality in number and for selecting a maximum value of said secondary similarity measures as said reference similarity measure, said concatenated reference patterns serving as said produced reference patterns and being concatenations of selected units which are selected from said recognition units in compliance with said stored reference patterns.

5. A speech recognition device as claimed in claim 4, further comprising a normalizing unit, connected to said similarity correcting unit, for normalizing said corrected similarity measure into a normalized similarity measure by a duration of time of said input pattern.

6. A speech recognition device as claimed in claim 5, further comprising a determining unit, connected to said normalizing unit for outputting, as a recognition result of said input speech signal when said normalized similarity measure is greater than said predetermined threshold value, a signal indicative of a specific one of said prepared reference patterns that gives said provisional similarity measure.

7. A speech recognition device as claimed in claim 6, further comprising a rejection unit, connected to said normalizing unit, for outputting a reject signal indicating that said input speech signal cannot be recognized when said normalized similarity measure is not greater than said predetermined threshold value.

8. A speech recognition device comprising:

means for supplying an input speech signal;

means for converting said input speech signal into an input pattern indicative of features of said input speech signal;

a similarity measure calculating unit for calculating primary similarity measures between said input pattern and a first plurality of prepared reference patterns and for selecting a maximum value of said primary similarity measures as a provisional similarity measure;

similarity measure calculating means for calculating secondary similarity measures between said input pattern and a second plurality of produced reference patterns produced in compliance with said prepared reference patterns and for selecting a maximum value of said secondary similarity measures as a reference similarity measure; and a similarity measure correcting unit connected to said similarity measure calculating unit and said similarity measure calculating means for correcting said provisional similarity measure by modifying said provisional similarity measure by either a difference between said provisional similarity measure and said reference similarity measure or a ratio of said provisional similarity measure and said reference similarity measure and for outputting said corrected provisional similarity measure as a corrected similarity measure, said input pattern being represented by a time sequence which is divisible into time sequence frames and comprises input feature vectors, said prepared reference patterns being stored reference patterns stored in said similarity measure calculating unit, each of said stored reference patterns being represented by a time sequence of stored feature vectors, wherein said similarity measure calculating means comprises:

an inter-vector similarity calculating unit connected to said similarity measure calculating unit and supplied with said input pattern for calculating inter-vector similarity measures between the input feature vectors of said time sequence frames and the stored feature vectors of said stored reference patterns with the inter-vector similarity measures of a first plurality in number calculated relative to each of said time sequence frames and for selecting maximum values of the inter-vector similarity measures calculated relative to said time sequence frames, respectively; and an accumulating unit connected to said inter-vector similarity calculating unit for accumulating said maximum values into an accumulation for use as said reference similarity measure.

9. A speech recognition device as claimed in claim 8, further comprising a normalizing unit, connected to said similarity correcting unit, for normalizing said corrected similarity measure into a normalized similarity measure by a duration of time of said input pattern.

10. A speech recognition device as claimed in claim 9, further comprising a determining unit, connected to said normalizing unit for outputting, as a recognition result of said input speech signal when said normalized similarity measure is greater than said predetermined threshold value, a signal indicative of a specific one of said prepared reference patterns that gives said provisional similarity measure.

11. A speech recognition device as claimed in claim 10, further comprising a rejection unit, connected to said normalizing unit, for outputting a reject signal indicating that said input speech signal cannot be recognized when said normalized similarity measure is not greater than said predetermined threshold value.

12. A speech recognition device comprising:
means for supplying an input speech signal;
means for converting said input speech signal into an input pattern indicative of features of said input speech signal;
a similarity measure calculating unit for calculating primary similarity measures between said input pattern and a first plurality of prepared reference patterns and for selecting a maximum value of said primary similarity measures as a provisional similarity measure;
similarity measure calculating means for calculating secondary similarity measures between said input pattern and a second plurality of produced reference patterns produced in compliance with said prepared reference patterns and for selecting a maximum value of said secondary similarity measures as a reference similarity measure; and
a similarity measure correcting unit connected to said similarity measure calculating unit and said similarity measure calculating means for correcting said provisional similarity measure by modifying said provisional similarity measure by either a difference between said provisional similarity measure and said reference similarity measure or a ratio of said provisional similarity measure and said reference similarity measure and for outputting said corrected provisional similarity measure as a corrected similarity measure, said similarity measure calculating unit comprising a first recognition unit memory for storing primary recognition units of said prepared reference patterns and a first calculating unit connected to said first recognition unit memory and supplied with said input pattern for calculating said primary similarity measures between said input pattern and primary concatenated reference patterns of a first plurality in number and for selecting a maximum value of said primary similarity measures as said provisional similarity measure, said primary concatenated reference patterns serving as said prepared reference patterns and being concatenations of primary selected units which are selected from said primary recognition units in compliance with said prepared reference patterns, wherein:

said similarity measure calculating means comprises:
a second recognition unit memory for storing secondary recognition units selected in compliance with said prepared reference patterns; and
a second calculating unit connected to said second recognition unit memory and supplied with said input pattern for calculating said secondary similarity measures between said input pattern and secondary concatenated reference patterns of said second plurality in number and for selecting a maximum value of said secondary similarity measures as said reference similarity measure, said secondary concatenated reference patterns serving as said produced reference patterns and being concatenations of secondary selected units which are selected from said secondary recognition units in compliance with said prepared reference patterns;

said input pattern becoming a succession of segment patterns corresponding to particular units concatenated among said primary selected units into one of said primary concatenated reference patterns that gives said provisional similarity measure, said similarity measure correcting unit comprising:
a unit similarity calculating unit connected to said first calculating unit for calculating unit similarity measures between said segment patterns and said particular units; and
a unit similarity correcting unit connected to said unit similarity calculating unit and said second calculating unit for dividing said reference similarity measure into interval similarity measures in correspondence to said particular units and for correcting each of said unit similarity measures into said corrected similarity measure by one of said interval similarity measures that corresponds to one of said particular units, said one of the particular units being used in calculating said each of the unit similarity measures.

13. A speech recognition device as claimed in claim 12, further comprising a normalizing unit, connected to said similarity correcting unit, for normalizing said corrected similarity measure into a normalized similarity measure by a duration of time of one of said segment patterns that is used in calculating said each of the unit similarity measures.

14. A speech recognition device as claimed in claim 13, further comprising a determining unit, connected to said normalizing unit for, when said normalized similarity measure is not greater than said predetermined threshold value, outputting as a recognition result of one of said segment patterns that gives said each of the unit similarity measures, a signal indicative of one of secondary selected units that is used in said secondary concatenated reference patterns and is related to said one of the interval similarity measures.

15. A speech recognition device as claimed in claim 14, further comprising a rejection unit connected to said normalizing unit for outputting a reject signal indicating that said input speech signal cannot be recognized when said normalized similarity measure is not greater than said predetermined threshold value.

16. A speech recognition device comprising:
means for supplying an input speech signal;
means for converting said input speech signal into an input pattern indicative of features of said input speech signal;
a similarity measure calculating unit for calculating primary similarity measures between said input pattern and a first plurality of prepared reference patterns and for selecting a maximum value of said primary similarity measures as a provisional similarity measure;
similarity measure calculating means for calculating secondary similarity measures between said input pattern and a second plurality of produced reference patterns produced in compliance with said prepared reference patterns and for selecting a maximum value of said secondary similarity measures as a reference similarity measure; and
a similarity measure correcting unit connected to said similarity measure calculating unit and said similarity measure calculating means for correcting said provisional similarity measure by modifying said provisional similarity measure by either a difference between said provisional similarity measure and said reference similarity measure or a ratio of said provisional similarity measure and said reference similarity measure and for outputting said corrected provisional similarity measure as a corrected similarity measure, said input pattern being represented by a time sequence of input feature vectors, said similarity measure calculating unit comprising a recognition unit memory for storing recognition units of said prepared reference patterns with each of said recognition units represented by a time sequence of stored feature vectors and an elementary calculating unit connected to said recognition unit memory and supplied with said input pattern for calculating, in connection with said input feature vectors and the stored feature vectors of said recognition units, said primary similarity measures between said input pattern and concatenated reference patterns of a first plurality in number and for selecting a maximum value of said primary similarity measures as said provisional similarity measure, said concatenated reference patterns serving as said prepared reference patterns and being concatenations of selected units which are selected from said recognition units in compliance with said prepared reference patterns, the time sequence of said input feature vectors being divisible into time sequence frames;
said similarity measure calculating means comprising:
an inter-vector similarity calculating unit connected to said recognition unit memory and supplied with said input pattern for calculating inter-vector similarity measures between the input feature vectors of said time sequence frames and the stored feature vectors of said recognition units with the inter-vector similarity measures of a second plurality in number calculated relative to each of said time sequence frames and for selecting maximum values of the inter-vector similarity measures which are calculated relative to said time sequence frames, respectively; and
an accumulating unit connected to said inter-vector similarity calculating unit for accumulating said maximum values into an accumulation for use as said reference similarity measure;
said input pattern becoming a succession of segment patterns corresponding to particular units concatenated among selected units into one of concatenated reference patterns that gives said provisional similarity measure, said similarity measure correcting unit comprising:
a unit similarity calculating unit connected to said elementary calculating unit for calculating unit similarity measures between said segment patterns and said particular units; and
a unit similarity correcting unit connected to said unit similarity calculating unit and said accumulating unit for dividing said reference similarity measure into interval similarity measures in correspondence to said particular units and for correcting each of said unit similarity measures into said corrected similarity measure by one of said interval similarity measures that corresponds to one of said particular units, said one of the particular units being used in calculating said each of the unit similarity measures.

17. A speech recognition device as claimed in claim 16, further comprising a normalizing unit, connected to said similarity correcting unit, for normalizing said corrected similarity measure into a normalized similarity measure by a duration of time of one of said segment patterns that is used in calculating said each of the unit similarity measures.

18. A speech recognition device as claimed in claim 17, further comprising a determining unit, connected to said normalizing unit, for outputting as a recognition result when said normalized similarity measure is greater than a predetermined threshold, a signal indicative of a specific one of said prepared reference patterns that gives said provisional similarity measure.

19. A speech recognition device as claimed in claim 18, further comprising a rejection unit connected to said normalizing unit for outputting a reject signal indicating that said input speech signal cannot be recognized when said normalized similarity measure is not greater than said predetermined threshold value.

* * * * *

UNITED STATES PATENT AND TRADEMARK OFFICE
CERTIFICATE OF CORRECTION

PATENT NO.    : 5,432,886
DATED         : July 11, 1995
INVENTOR(S)   : Satoshi TSUKADA et al.

It is certified that error(s) appears in the above-identified patent and that said Letters Patent is hereby corrected as shown below:

Col. 2, line 64, delete "afore-understood".

Col. 5, line 1, after "The" insert --purpose and function of the--.

Signed and Sealed this

Sixteenth Day of January, 1996

Attest:

BRUCE LEHMAN

Attesting Officer

Commissioner of Patents and Trademarks